United States Patent Office 3,337,296
Patented Aug. 22, 1967

3,337,296
PURIFICATION OF AQUEOUS SALT SOLUTIONS
Richard L. Hill, Williamsburg, Va., assignor to The Dow Chemical Company, Midland, Mich., a corporation of Delaware
No Drawing. Filed Jan. 28, 1966, Ser. No. 523,547
15 Claims. (Cl. 23—97)

This application is a continuation-in-part of copending application for United States Letters Patent having Ser. No. 300,677, filed Aug. 7, 1963 and now abandoned.

This invention relates to a method for purifying aqueous salt solutions. In particular, it relates to a method for removing iron which is present as an impurity in certain aqueous salt solutions, and additionally, it relates to a method for removing organic matter which may be present as an impurity in the salt solutions in addition to removing iron therefrom.

There are many needs which require the use of inorganic salt solutions in a relatively pure form. For example, the use of aqueous salt solutions for coagulating latex or polymer emulsions requires relatively pure solutions in that the coagulation of such polymers is a delicate and easily upset operation and the presence of impurities may adversely affect the product properties. Additionally, many of the aqueous salt or saline solutions are useful for dissolving therein fiber-forming polymers which are extruded from the solution to form synthetic textile filaments. When using such salt solutions as the fiber-forming polymer solvent, it is a common practice to extrude the fiber-forming solution into an aqueous coagulating bath containing the same salt constituents that are present in the polymer solvent. It is then convenient and economical to reuse the coagulating solution, which has become more concentrated but not to the point of being in a polymer dissolving concentration, as the polymer solvent in a subsequent spinning operation. In other words, the process is cyclic of dissolving a polymer in an aqueous solution, spinning the solution into an aqueous coagulating bath and then reconcentrating the aqueous coagulating bath for use as the polymer solvent in a subsequent spinning operation. When this procedure is followed the solvent often becomes contaminated with various impurities that are used or accumulate in the spinning solution and coagulating bath. For instance, iron may be introduced through corrosion of process equipment. Additionally, certain organic matter will accumulate in the solutions, particularly there will be a build-up of the fiber-forming polymer or the monomer from which the polymer is formed. Such build-up of impurities is undesirable since ordinarily traces of such impurities, for example iron, as well as organic matter, are usually found to impair the quality of the fiber that is formed, for example, the heat stability and/or the light stability of the synthetic textile fiber that is spun from such solutions may be unacceptable.

One means that has been disclosed for removing metallic impurities from aqueous salt solutions is that of U.S. 2,746,840. While quite good results are obtained by that method, it involves a rather detailed treatment and requires raising the solution to the boiling point. In addition, the water-soluble persulfate described to be used in the process has a tendency to introduce sulfate contamination into the solution. Another method that has been used to treat such salt solutions to remove impurities, particularly iron and manganese, is that disclosed in copending application of Van Dijk et al. having Ser. No. 28,138 and filed May 10, 1960 now matured into U.S. 3,148,944, issued September 15, 1964. However, the use as described therein of $KMnO_4$ requires very close control, otherwise manganese contamination of the solution may result in that unless the amount of permanganate that is added is very closely controlled, manganese that had once taken on the form of $MnO_2$ reverts back to a soluble manganous ion and is not filtered out in the filtration step. In addition, the permanganate removes little or none of the organic matter that may be present in the solution as an impurity.

It is, therefore, an object of this invention to provide a relatively simple, expedient, reliable purification method that provides reproducible results for purifying aqueous salt solutions that contain at least trace amounts of iron as an impurity. It is a further object of the invention to provide a method for purifying aqueous salt solutions that contain at least trace amounts of iron and organic matter as impurities therein. It is a still further object of the invention to purify aqueous salt solutions that are suitable in a concentrated form as solvents for certain fiber-forming polymers and which contain at least trace amounts of iron as an impurity. It is a yet further object of the invention to purify aqueous salt solutions that are suitable in concentrated forms to dissolve fiber-forming acrylonitrile polymers that contain at least trace amounts of iron and organic matter as impurities and which solutions have been used to coagulate such fiber-forming acrylonitrile polymer fibers into synthetic filaments.

These, as well as additional objects and the associated advantages and benefits are achieved by and in accordance with the present invention which comprises a method for the purification of an acidic aqueous salt solution, said solution having such an acidity that when it is adjusted with distilled water to be about a 10 weight percent salt solution it has a pH less than about 5.0 such as pH of between about 2.0 and 4.0, said solution containing at least trace amounts of iron as an impurity, said salt comprised of cations selected from the group consisting of alkali metals, Group II metals, and the divalent metals of copper, lead, cobalt, nickel and manganese and anions selected from the group consisting of $Cl^-$, $Br^-$, and $NO_3^-$, comprising mixing with said solution a stoichiometric excess of hydrogen peroxide necessary to oxidize the iron present in said solution to ferric ions; mixing with said solution a zirconium compound selected from the group consisting of zirconyl chloride, zirconyl bromide, zirconyl nitrate, zirconium tetrachloride, and zirconium tetrabromide (and including their partially hydrolyzed and partially neutralized forms) in an amount that is not less than about $7 \times 10^{-5}$ mole zirconium compound per kilogram of solution treated; then mixing with said solution a base dispersible in and inert to said solution to raise the pH of said solution to such an acidity that when said solution is adjusted with distilled water to be about a 10 weight percent solution of said salt it has a pH of at least about 5.0; and, subsequently separating the precipitated material from said solution and recovering said solution containing significantly less iron as an impurity.

The present method provides an excellent means for purifying aqueous salt solutions with respect to at least iron and additionally is very effective for the removal of organic material present as an impurity in the treated solution. It provides a purification treatment which can be carried out in essentially a single operation with excellent efficiency and ease of control. In addition, the operation is conveniently carried out at ambient temperature and a minimum, if any, contamination of the solution occurs from the treatment.

Solutions of the chlorides of the alkali and alkaline earth metals are advantageously treated in accordance with the present method. However, the chlorides of the other metals of Group II of the Periodic System as well as the alkaline earth metals can be treated by the present method. In addition, solutions of the divalent metal chlorides of copper, lead, cobalt, nickel and manganese are also conveniently purified in accordance with the invention. Advantageously, aqueous zinc chloride solutions are thus purified. Also, as indicated, the aqueous solutions of the bromides and nitrates of the above indicated metals can be treated in accordance with the present method.

The invention is particularly applicable to the purification of relatively concentrated aqueous salt solutions and especially designed for that purpose in that the necessity to dilute the salt solutions before the treatment is obviated. This has obvious advantages that will be appreciated by the artisan. The method is particularly beneficial for treating solutions of from about 10 weight percent of the salt, based on the weight of the solution, up to the saturation concentration of the salt in the aqueous medium, although more dilute solutions can also be employed. Ordinarily, salt solutions having a concentration of from about 20 to 40 weight percent of the salt based on the weight of the solution are treated. Although much more concentrated solutions, for example up to 65 weight percent or so, can be treated by the purification method, it is generally found that the filtration of such highly concentrated solutions becomes burdensome in that the viscosity of these solutions may be extremely high. When acrylonitrile polymer fibers are spun from aqueous zinc chloride solutions, for example, the concentration of the zinc chloride in order to be an effective solvent for such polymers is ordinarily in the neighborhood of from about 55 to 65 weight percent. These polymer solutions are normally spun into an aqueous zinc chloride coagulation bath to which is continually added water such that the resulting coagulation solution contains from about 25 to 45 weight percent zinc chloride. The spent coagulation bath liquid is thus conveniently treated and purified by the present method to remove essentially completely all iron present as an impurity which may be introduced with any make-up zinc chloride or which has accumulated through the processing pipes and so forth or introduced by the diluent water. In addition, as previously mentioned, any of the residual polymer or monomer that may accumulate in the coagulation bath liquid is significantly reduced and thus any build-up of such impurity is prevented.

The present invention will be described particularly with respect to the treating of aqueous zinc chloride solutions that are obtained as recycle from coagulation baths in the spinning of acrylonitrile polymer fibers from concentrated aqueous zinc chloride solutions. It is to be understood, however, that the invention is applicable to the purification of any of the herein indicated aqueous salt solutions no matter from what source they are obtained.

In the purification treatment, the iron which is present in the aqueous salt solution as an impurity and normally present in the ferrous state is oxidized to the ferric state by addition of the excess hydrogen peroxide to the solution which should be slightly acidic. In particular, as indicated, the salt solution that is to be purified should have such an acidity that when it is adjusted with distilled water to be about a 10 weight percent salt solution it has a pH less than about 5.0. Of course, if a 10 weight percent solution is being treated no adjustment with distilled water need be made, or, if a more dilute solution is involved, the pH can be measured directly and back calculated to a 10 percent solution or zinc chloride could be added to bring the concentration to 10 percent. The salt constituent in the aqueous solution may impart an acidic character to the solution, for example, as in the case of $ZnCl_2$ solutions, ordinarily a pH less than about 5 results, as measured on an adjusted solution as discussed above. If the concentration, or nature, of the salt in the solution is not enough to effect a pH below about 5 of the solution adjusted to about 10 weight percent, then it may be desirable that the solution first be acidified with a suitable acid. For example, when the solution is an aqueous zinc chloride solution, then, conveniently, HCl is used to reduce the pH of the solution. This is generally necessary to avoid causing precipitation of the zirconium compound immediately upon its addition to the solution. After the hydrogen peroxide has been added and sufficient time has been allowed to oxidize the iron to the ferric state, the zirconium compound is then admixed with the solution to provide a homogeneous mixture. Subsequently, a base or basic material or compound is added to the solution to raise the pH of the solution above about 5, and preferably above about 5.5 which, as before, is measured on the solution adjusted with distilled water to have a concentration of about 10 weight percent salt, which causes precipitation of the ferric iron as the hydrous oxide. The zirconium in the solution simultaneously is precipitated as hydrous zirconia which conveniently acts as a collector for the iron precipitates, removes the excess peroxide, and carries down with it a substantial fraction of the organic matter that may be present in the treated solution. The hydrous oxides of iron and zirconium, i.e., zirconia, together with the adsorbed or co-precipitated organic matter are then removed by filtration or other conventional means.

The stoichiometric amount of hydrogen peroxide required to oxidize all of the iron originally present is calculated to be one part of hydrogen peroxide per 3.29 parts of iron. However, the amount of hydrogen peroxide should be added in an excess over the amount stoichiometrically necessary to oxidize all of the iron. This is to assure complete contact and oxidation of the iron. For example, when an aqueous 35 weight percent zinc chloride solution is being purified which contains up to about 60 p.p.m. iron, the addition of 50 p.p.m. hydrogen peroxide is found to be entirely adequate to completely oxidize all of the iron present in a conveniently short time without excessive mixing. The amount of the hydrogen peroxide that is necessary or desired to be added to the solution can be readily determined by analyzing a small sample of the solution that is to be treated to determine the amount of iron that is present therein. The hydrogen peroxide is conveniently added as an aqueous solution of the hydrogen peroxide. It is preferable that this be a rather concentrated solution in order to avoid diluting the salt solution that is to be purified. Hydrogen peroxide is particularly well adapted as the oxidant in the purification treatment in that any excess of the hydrogen peroxide is ordinarily removed during the treatment by the action of the zirconium compound, and even if it is not removed by the zirconium compound, any residual hydrogen peroxide in the solution, if its presence in the solution is detrimental, can easily be destroyed by heating and thus the addition of any foreign ions to the solution is obviated.

The zirconium compounds that are used in the purification of the aqueous salt solutions are zirconyl chloride, zirconyl bromide, zirconyl nitrate (which terminology is commonly used interchangeably in the art with zirconium oxychloride, zirconium oxybromide and zirconium oxynitrate, respectively), zirconium tetrachloride, and zirconium tetrabromide. In the practice of the invention it is preferable to add the zirconium compound as an aqueous solution to the salt solution, for example, as an aqueous 20–40 weight percent solution of the zirconium compound. Therefore, it is to be understood, that the employment of the indicated zirconium compounds includes their partially hydrolyzed and partially neutralized forms. Although not entirely necessary, it is advantageous to avoid contamination of the treated solution with foreign ions to use the zirconium compound that has the same anion as the anion of the principal salt. In other words, if a chloride solution is being treated then it is preferable to use zirconyl chloride or zirconium tetrachloride (which is usually observed to hydrolyze to $ZrOCl_2$ and HCl). Specifically, when zinc chloride is being treated it is desirable that the zirconyl chloride be used as the precipitating agent, or if the solution being treated is a solution of a nitrate salt, then zirconyl nitrate is preferably employed.

The amount of the zirconium salt that is added is preferably not less than about $7 \times 10^{-5}$ mole zirconium compound per kilogram of salt solution treated. Since the hydrogen peroxide added to oxidize the iron is usually added in an excess over that needed to fulfill the oxidation there will ordinarily be a residual amount of hydrogen peroxide left in the solution. When there is an excess of zirconium compound, over the amount of hydrogen peroxide, the zirconium compound serves to remove this residual hydrogen peroxide. Beneficially, the amount of the zirconium salt added should be in the range, on a molar ratio of zirconium salt to hydrogen peroxide, of about 0.15:1 to 5:1. It has been found that both mild and strong treatments with the zirconium salts are desirable. When it is desirable only to remove the iron present as an impurity, the low molar ratio is quite beneficial. Excess hydrogen peroxide eventually decomposes, causing no detriment to reuse of the treated solution. If it is preferable to remove practically all hydrogen peroxide present, as well as a quantity of organic matter present, an equimolar ratio of zirconium salt to hydrogen peroxide is most useful, with molar ratios up to about 5:1 being sometimes desirable. An excess of the zirconium compound ordinarily has no ill effects on the purification treatment. This is for reasons that if sufficient base is added to elevate the pH to at least about 5, and preferably about 5.5, as measured on the adjusted solution as hereinbefore indicated, then essentially complete removal of zirconium from the solution is effected.

When organic material is present in a solution in addition to the iron impurity, the amount of the zirconium salt that is added is determined somewhat by balancing between the degree of organic matter removal desired and the difficulty of filtration of these solutions once precipitation has been completed. The amount of organic matter that is removed increases as the amount of zirconium salt added to the solution is increased, and, also, the difficulty of filtration increases with an increasing amount of zirconium salt since more precipitate is formed. Thus, when organic matter is to be removed in addition to the iron, the amount of zirconium salt will exceed, to a considerable degree, the amount of hydrogen peroxide that is added. The necessary amount of zirconium salt that is desirable can readily be determined by sampling the solution to be treated and adding enough zirconium salt to remove the iron as well as the desired amount of organic matter and balancing this with the degree of difficulty of filtration of the solution containing the precipitate. If essentially complete removal of organic matter is desired, it may be convenient to treat a solution sequentially with the purification treatment of the invention, i.e., two or more times, or, after the first step of removing iron, subsequently treat the solution one or more times with the zirconium compound to remove the organic matter. Although this can be effected in one step if desired, as mentioned, the filtration becomes more difficult as more of the organic matter is precipitated in the solution.

The base that is added to the solution to raise the pH can be any suitable basic compound that is dispersible in the solution and effective to raise the pH thereof and is inert to the salt dissolved therein. Exemplary of some of the suitable bases for this purpose are ZnO, NaOH, KOH, NH$_4$OH, CaO, MgO, etc. Beneficially, the base that is chosen has the same cation as the cation of the salt of the principal salt of the solution to avoid introducing foreign ions into the solution, although this is not entirely necessary if the cation of the base is not detrimental to the purified solution. For instance, when an aqueous zinc chloride solution is being treated, zinc oxide is conveniently used as the precipitating base.

For precipitation of the zirconium compound as hydrous zirconia, as mentioned, the pH of the solution should be at least about 5 and preferably at least about 5.5 as measured on the solution adjusted to about a 10 weight percent solution. Therefore, the amount of the base, for example, zinc oxide, that is added must be sufficient to raise the pH of the solution to at least this level. An excess of the base usually is of no moment particularly when the cation of the base is common to the cation of the principal salt. If desired, any excess of the base that is added can be neutralized after the filtration treatment. For example, when an aqueous zinc chloride solution is being treated, and zinc oxide is used as the base to raise the pH to cause precipitation, any excess of the zinc oxide remaining in solution can be neutralized by the addition of HCl which merely produces additional zinc chloride in the solution and adds no foreign ions whatever to the solution. As with determining the amount of the other reagents that need be added, the amount of the base that is required can readily be determined by sampling the solution to be purified and determining the pH from which the amount of necessary zinc oxide can readily be determined. It is difficult to determine accurately the pH of a relatively concentrated aqueous salt solution, since it often attacks the glass electrode ordinarily used for pH measurements resulting in inaccurate or meaningless measurements. Therefore, it is ordinarily convenient to dilute the solution down to about at least a 10 weight percent solution and then determine the pH of the diluted solution.

The purification treatment of the invention is conveniently carried out at ambient temperature. The solution can be chilled or heated but there is no apparent increase in efficiency and doing such would merely impose an economical burden on the method. Effective purification is accomplished in a relatively short time. Generally only enough time need be allowed for adequate mixing of each of the added constituents. Effective purification can be accomplished readily within a period of ½ hour although shorter and certainly longer times can be employed if desired.

Any suitable filtration means can be used to separate the precipitated material from the solution. For example, forcing the solution through a sintered glass or using any of the conventional vacuum filtration techniques can be employed. With the dilute solutions, quite good separations can be achieved merely by allowing the precipitated material to settle and decanting off the filtrate. Other separating means can be employed such as centrifuging if justified. In order to facilitate the filtration step, any of the various conventional filter aids may be used such as Celite.

In order to further illustrate the invention, five aqueous zinc chloride solutions that had been used in coagulation baths for spinning acrylonitrile polymer fibers from aqueous ZnCl$_2$ solutions, were treated according to the herein described method wherein, unless otherwise specified, all parts and percentages are by weight. The solutions ranged in zinc chloride concentration from 30–35 weight percent, contained from 5 to 56 p.p.m. iron, and from 600–765 p.p.m. organic matter (determined by evaporation of the solution and fusion of the residue at 400° C., dissolution of the melt in water, and followed by optical density measurement of the resultant char slurry under standardized conditions calibrated with aqueous 60 percent ZnCl$_2$ solutions of known polyacrylonitrile content).

After the purification treatment the purified zinc chloride solutions contained not more than 0.07 p.p.m. iron, and 41–47 percent of the organic matter originally present in the solution had been removed.

More specifically, the purification treatment was according to the following procedure;

(a) To the aqueous ZnCl$_2$ solutions were added 50 p.p.m. H$_2$O$_2$ as a 30–35 weight percent aqueous solution of the H$_2$O$_2$ and the solution was stirred one to two minutes;

(b) Then, 0.25 weight percent (2500 p.p.m.)

$$ZrOCl_2 \cdot 8H_2O$$

based on the weight of the ZnCl$_2$ solution, was added as a 20–40 weight percent aqueous solution of the ZrOCl$_2$ and the solution was stirred 5 to 10 minutes;

(c) To the ZnCl₂ solution was next added 0.25 weight percent (2500 p.p.m.) ZnO, based on the weight of the ZnCl₂ solution, as a 10–20 weight percent aqueous slurry of the ZnO; the solution was stirred about 10 minutes after which a sample of the solution was withdrawn, diluted with 4 volumes of distilled water to about a 10 weight percent ZnCl₂ solution and analyzed for pH; if the pH of the diluted solution was not at least 5.5, additional ZnO was added to the main solution and the pH redetermined on a diluted sample as before.

(d) The solution was subsequently filtered to remove the precipitated material and the filtrate was recovered and analyzed for iron and organic matter.

The results are set forth in Table I.

TABLE I

| Solution (30–35 Wt. Percent ZnCl₂) | Impurities in Unpurified Solution | | Impurities in Solution After Purification with ZrOCl₂ | | | |
|---|---|---|---|---|---|---|
| | Fe [1] (p.p.m.) | Organic Matter [2] (p.p.m.) | Fe [1] (p.p.m.) | Organic Matter [2] (p.p.m.) | Zr [1] (p.p.m.) | Percent Organic Matter Removed |
| A | 6.41 | 665 | 0.07 | 376 | <0.08 | 43.5 |
| B | 5.00 | 600 | 0.03 | 355 | <0.08 | 40.6 |
| C | 5.63 | 655 | <0.03 | 351 | <0.08 | 46.5 |
| D | 42.5 | 740 | 0.03 | 393 | 0.2 | 47.0 |
| E | 56.5 | 765 | <0.03 | 420 | <0.08 | 45.1 |

[1] Fe by weight on 35% ZnCl₂ solution weight.
[2] By weight based on 60% ZnCl₂ solution weight.

In contrast, portions of the same five ZnCl₂ solutions were subjected to a parallel purification employing KMnO₄ as the purifying agent. Each solution was first neutralized with ZnO to a pH of at least equal to or greater than about 5.5 as measured on a sample of the solution diluted with distilled water to about a 10 weight percent ZnCl₂ solution, titrated with KMnO₄ solution to a faint pink end point and then filtered to remove precipitated material. The product solutions contained less than 0.05 p.p.m. iron, but in most instances none of the organic matter was removed.

These results are set forth in Table II.

TABLE II

| Solution | Impurities in Solution After Purification with KMnO₄ | | | |
|---|---|---|---|---|
| | Fe [1] (p.p.m.) | Organic Matter [2] (p.p.m.) | Mn [2] (p.p.m.) | Percent Organic Matter Removed |
| A | <0.05 | 630 | N.D. | 5.3 |
| B | <0.05 | 635 | N.D. | Nil |
| C | <0.05 | 665 | N.D. | Nil |
| D | <0.05 | 715 | 3.2 | 3.4 |
| E | <0.05 | 765 | 4.0 | 0.0 |

[1] Fe by weight based on 35% ZnCl₂ solution weight.
[2] By weight based on 60% ZnCl₂ solution weight.
N.D.—Not determined.

To illustrate the lower concentration purification treatment, an aqueous zinc chloride solution, containing about 4.93 p.p.m. iron, was treated according to the following procedure;

(a) To the aqueous ZnCl₂ solution was added 30 p.p.m. H₂O₂ as a 30–35 weight percent aqueous solution of the H₂O₂ and the solution was stirred one to two minutes;

(b) Then, 0.0046 weight percent (46.2 p.p.m.)

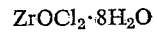

$ZrOCl_2 \cdot 8H_2O$ based on the weight of the ZnCl₂ solution, was added as a 20–40 weight percent aqueous solution of the ZrOCl₂ and the solution was stirred 5 to 10 minutes;

(c) To the ZnCl₂ solution was next added 0.13 weight percent (1300 p.p.m.) ZnO, based on the weight of the ZnCl₂ solution as a 10–20 weight percent aqueous slurry of the ZnO; the solution was stirred about 10 minutes after which a sample of the solution was withdrawn, diluted with 4 volumes of distilled water to about a 10 weight percent ZnCl₂ solution and analyzed for pH; if the pH of the diluted solution was not at least 5.5, additional ZnO was added to the main solution and the pH redetermined on a diluted sample as before;

(d) The solution was subsequently filtered to remove the precipitated material and the filtrate was recovered and analyzed for iron, which amounted to 0.07 p.p.m., remaining in the treated ZnCl₂ solution.

What is claimed is:

1. The method for purifying an acidic aqueous salt solution, said solution having such an acidity that when it is adjusted with distilled water to be about a 10 weight percent salt solution it has a pH less than about 5.0, said solution containing at least trace amounts of iron as an impurity, said solution comprised of salts having cations selected from the group consisting of alkali metals, Group II metals, and the divalent metals of copper, lead, cobalt, nickel, and manganese, and anions selected from the group consisting of $Cl^-$, $Br^-$, and $NO_3^-$ comprising (a) mixing with said solution a stoichiometric excess of hydrogen peroxide necessary to oxidize said iron present in said solution to ferric ions;

(b) mixing with said solution a zirconium compound selected from the group consisting of zirconyl chloride, zirconyl bromide, zirconyl nitrate, zirconium tetrachloride, and zirconium tetrabromide in an amount that is not less than about $7 \times 10^{-5}$ mole zirconium compound per kilogram of salt solution treated; then, (c) precipitating the iron and zirconium-containing materials by mixing with said solution a base dispersible in and inert to said solution to raise the pH of said solution to such an acidity that when said solution is adjusted with distilled water to be about a 10 weight percent solution of said salt it has a pH of at least about 5.0; and, (d) subsequently separating the precipitated material from said solution and recovering said solution containing a significantly reduced amount of iron.

2. The method for purifying an acidic aqueous salt solution, said solution having such an acidity that when it is adjusted with distilled water to be about a 10 weight percent salt solution it has a pH less than about 5.0, said solution containing at least trace amounts of iron and organic material as impurities, said solution comprised of salts having cations selected from the group consisting of alkali metals, Group II metals, and the divalent metals of copper, lead, cobalt, nickel, and manganese, and anions selected from the group consisting of $Cl^-$, $Br^-$, and $NO_3^-$ comprising (a) mixing with said solution a stoichiometric excess of hydrogen peroxide necessary to oxidize said iron present in said solution to ferric ions;

(b) mixing with said solution a zirconium compound selected from the group consisting of zirconyl chloride, zirconyl bromide, zirconyl nitrate, zirconium tetrachloride, and zirconium tetrabromide in an amount that is not less than about $7 \times 10^{-5}$ mole zirconium compound per kilogram of salt solution treated and in excess of the combined amount on a weight basis of said iron and said organic material present in said solution; then,
(c) precipitating the iron and zirconium-containing materials by mixing with said solution a base dispersible in and inert to said solution to raise the pH of said solution to such an acidity that when said solution is adjusted with distilled water to be about a 10 weight percent solution of said salt it has a pH of at least about 5.0; and,
(d) subsequently separating the precipitated material from said solution and recovering said solution containing significantly reduced amounts of iron and organic matter.

3. The method for purifying an acidic aqueous salt solution of claim 1 wherein the zirconium compound mixed with said solution is zirconyl chloride.

4. The method for purifying an acidic aqueous salt solution of claim 1 wherein the base mixed with said solution has a cation the same as the metal of said salt.

5. The method for purifying an acidic aqueous salt solution of claim 2 wherein the zirconium compound mixed with said solution is zirconyl chloride.

6. The method for purifying an acidic aqueous salt solution of claim 2 wherein the base mixed with said solution has a cation the same as the metal of said salt.

7. The method for purifying an acidic aqueous zinc chloride solution containing at least about 10 weight percent zinc chloride, said solution having such an acidity that when it is adjusted with distilled water to be about a 10 weight percent salt solution it has a pH less than about 5.0, said solution containing at least trace amounts of iron as an impurity comprising
(a) mixing with said solution a stoichiometric excess of hydrogen peroxide to oxidize said iron present in said solution to ferric ions;
(b) mixing with said solution zirconyl chloride in an amount that is not less than about $7 \times 10^{-5}$ mole zirconyl chloride per kilogram of zinc chloride solution treated; then,
(c) precipitating the iron and zirconium-containing materials by mixing with said solution zinc oxide to raise the pH of said solution to such an acidity that when said solution is adjusted with distilled water to be about a 10 weight percent solution of said salt it has a pH of at least about 5.0; and,
(d) subsequently separating the precipitated material from said solution and recovering said solution containing a significantly reduced amount of iron.

8. The method of claim 7 wherein said salt solution when it is adjusted with distilled water to be about a 10 weight percent salt solution has a pH of between about 2.0 and 4.0.

9. The method of claim 7 wherein said zinc chloride solution is an aqueous about 20 to about 40 weight percent zinc chloride solution.

10. The method of claim 7 wherein zinc oxide is mixed with said solution in an amount that is sufficient to raise the pH of said solution to at least about 5.5 as measured on said adjusted solution.

11. The method for purifying acidic aqueous zinc chloride solution containing at least about 10 weight percent zinc chloride said solution having such an acidity that when it is adjusted with distilled water to be about a 10 weight percent salt solution it has a pH less than about 5.0, said solution containing at least trace amounts of iron and organic material as impurities comprising
(a) mixing with said solution a stoichiometric excess of hydrogen peroxide to oxidize said iron present in said solution to ferric ions;
(b) mixing with said solution zirconyl chloride in an amount that is not less than about $7 \times 10^{-5}$ mole zirconyl chloride per kilogram of zinc chloride solution treated and in excess of the combined amount on a weight basis of said iron and said organic material; then,
(c) precipitating the iron and zirconium-containing materials by mixing with said solution zinc oxide to raise the pH of said solution to such an acidity that when said solution is adjusted with distilled water to be about a 10 weight percent solution of said salt it has a pH of at least about 5.0; and,
(d) subsequently separating the precipitated material from said solution and recovering said solution containing significantly reduced amounts of iron and organic material.

12. The method of claim 11 wherein said salt solution when it is adjusted with distilled water to be about a 10 weight percent salt solution has a pH of between about 2.0 and 4.0.

13. The method of claim 11 wherein said zinc chloride solution is an aqueous about 20 to about 40 weight percent zinc chloride solution.

14. The method of claim 11 wherein zinc oxide is mixed with said solution in an amount that is sufficient to raise the pH of said solution to at least about 5.5 as measured on said adjusted solution.

15. The method of claim 11 wherein said organic material consists essentially of acrylonitrile polymers.

References Cited
UNITED STATES PATENTS

| | | | |
|---|---|---|---|
| 2,369,270 | 2/1945 | Waddell | 23—50 |
| 2,402,371 | 6/1946 | Christensen | 23—91 X |
| 2,746,840 | 5/1956 | Davis | 23—97 |
| 3,148,944 | 9/1964 | Van Dijk et al. | 23—97 |

OSCAR R. VERTIZ, *Primary Examiner.*

EDWARD STERN, *Examiner.*